United States Patent
Wintner et al.

(10) Patent No.: US 6,363,090 B1
(45) Date of Patent: Mar. 26, 2002

(54) LASER SYSTEM FOR PRODUCING ULTRA-SHORT LIGHT PULSES

(75) Inventors: Ernst Wintner, Oberweiden; Evgeni Sorokin; Irina Sorokina, both of Bernstein, all of (AT)

(73) Assignee: Dentek-Lasersystems Produktions Ges.m.b.H, Osterreich (AT)

( * ) Notice: Subject to any disclaimer, the term of this patent is extended or adjusted under 35 U.S.C. 154(b) by 0 days.

(21) Appl. No.: 09/256,892

(22) Filed: Feb. 24, 1999

(30) Foreign Application Priority Data

Feb. 25, 1998 (AT) ................................. 339/98

(51) Int. Cl.⁷ ............................ H01S 3/10; H01S 3/098
(52) U.S. Cl. .............................. 372/21; 372/18; 372/25
(58) Field of Search .............................. 372/10, 18, 21, 372/25

(56) References Cited

U.S. PATENT DOCUMENTS

| | | | |
|---|---|---|---|
| 4,928,282 A | | 5/1990 | Barthelemy et al. |
| 5,007,059 A | * | 4/1991 | Keller et al. .................. 372/18 |
| 5,553,088 A | | 9/1996 | Brauch et al. |
| 5,966,390 A | * | 10/1999 | Stingl et al. .................. 372/18 |
| 6,016,324 A | * | 1/2000 | Rieger et al. .................. 372/25 |
| 6,150,630 A | * | 11/2000 | Perry et al. ............. 219/121.68 |

FOREIGN PATENT DOCUMENTS

EP      0 492 994 A2      7/1992

OTHER PUBLICATIONS

Optical Society of America, vol. 16, No. 21 dated Nov. 1, 1991, "Mode locking of Ti:Al₂O₃ lasers and self–focusing: a Gaussian approximation".

Optical Society of America, vol. 16, No. 1 dated Jan. 1, 1991, "60–fsec pulse generation from a self–mode–locked Ti: sapphire laser".

Optical Society of America, vol. 15, No. 221 dated Nov. 15, 1991, "Starting dynamics of additive–pulse ode locking in the Ti:Al₂O₃ laser".

* cited by examiner

Primary Examiner—James W. Davie
Assistant Examiner—James Menefee
(74) Attorney, Agent, or Firm—Sonnenschein Nath & Rosenthal

(57) ABSTRACT

A laser system for the generation of an ultra-short light pulse—with a laser resonator which contains at least one active solid-state oscillator element, preferably a thin disk of a laser-active crystal with a high amplification bandwidth, particularly of a "quasi-three-level" system such as Yb:YAG—comprises at least one respective arrangement for phasecoupling of the laser modes and for dispersion compensation. For industrial applications, in order to be able to emit ultra-short pulses with very high average powers in a power-scalable fashion while being constructed optimally simply and inexpensively, the arrangement for phase coupling is constructed as a passive, non-linear element, and a prismless arrangement for dispersion compensation is provided.

26 Claims, 2 Drawing Sheets

LASER SYSTEM FOR PRODUCING ULTRA-SHORT LIGHT PULSES

BACKGROUND OF THE INVENTION

The invention relates to a laser system for generating ultra-short light pulses, with a laser resonator which comprises at least one active solid-state oscillator element, preferably a thin disk of a laser-active crystal with a high amplification bandwidth, particularly of a "quasi-three-level" system, such as Yb:YAG, and a means for phase coupling of the laser modes and for dispersion compensation, respectively.

In recent years, a dramatic breakthrough was achieved in the technology of ultra-short pulses. The typical femtosecond-pulse sources of the preceding decade, (gas) ion laser pump sources and (liquid) dye oscillators and amplifiers have given way to solid-state systems, particularly the Ti:sapphire oscillators which are pumped by diode-pumped, frequency-doubled Nd-lasers, and the Ti:sapphire amplifiers, which are pumped by lamp-pumped frequency-doubled Nd-lasers. Another type of femtosecond laser is based on Cr-doped fluoride crystals (LiSGaF, LiSAF), which can be directly diode-pumped at 670 nm and approach the performance of the Ti:sapphire with reference to the pulse period. Other output parameters such as pulse energy and average power have also been notably improved. However, due to the high complexity of the apparatuses for high powers—multi-step architecture of the systems—and to the high apparatus and control outlay and the high costs associated with this, real economic applications are not yet foreseeable. For the pulse period range under 100 fs, which is rather insignificant for non-scientific applications, a high outlay can be justified, given complex solutions, but for the economically significant pulse period between 100 and 500 fs, there are no suitable alternatives for high average powers over 1 W.

Because of its good and proven thermo-optical properties and low Stokes dislocation, a Yb:YAG crystal is an ideal laser medium, said crystal enabling high average powers and permitting direct pumping on the basis of suitable absorption properties at available high-power diode wavelengths and of a long lifetime of the excited state.

By means of a new concept, that of the disk laser described in U.S. Pat. No. 5,553,088, a power scale ability in the range of ca. 10 W to ca. 1 kW average power has been successfully achieved for high-power systems. The reduced thermal lens effect and the potentially compact architecture allow a compact structure which is suitable for industrial applications, along with an effectivity of over 50%.

The generation of ultra-short pulses with high energies, which is necessary for the processing of material with new properties such as acoustic and thermal shock protection, for example, has not yet been realized with this type of solid-state laser, nor are there any approaches toward achieving this object indicated in the cited patent.

SUMMARY OF THE INVENTION

It is thus the object of the present invention to provide a laser system which can emit ultra-short pulses in a power-scalable fashion with very high average powers for industrial applications, and which is also constructed optimally simply and without great outlay.

This object is inventively achieved in that the means for phase coupling is constructed as a passive, non-linear element, and that a prismless means for dispersion compensation is provided. The passive phase coupling via non-linear optical elements enables the simplest generation of ultra-short pulses. A broader range of average powers is achieved specifically with Yb:YAG in the form of a disk laser with at least one laser-active element in the form of a preferably 200 to 400 $\mu$m thick disk several millimeters in diameter, this system being suitable for the generation of pulses in the $\mu$J and mJ range (latter with amplifier) with pulse widths of approximately 200 fs. Furthermore, long beam paths, partially in glass, can be avoided by means of the prismless construction of the means for dispersion compensation; the adjustment stability is better maintained; and the post-calibration is less complicated. Overall, prismless means are more compact, less maintenance-intensive and more economical.

For laser systems of lower power (a few 100 mW) and on a different basis, a passive mode-coupling method was realized by means of a Kerr lens device (see EP-0 492 994 A2); yet there are no indications of the application thereof in high-power laser systems with ultra-short pulses. Rather, further progress was made with semiconductor-based saturable absorbers (SESAMs), which, however, have proven to be too short-lived for high-power laser systems with respect to their utility at powers over a few 100 mW. The non-linear optical methods are preferable, since they can be power-scaled by means of corresponding focusing of the beam and are not based on the direct absorption of radiation.

According to another feature of the invention, it is provided that the means for phase coupling is constructed as a Kerr lens phase coupling device, preferably with a soft diaphragm. An APM device or a non-linear mirror arrangement with non-linearity of the $2^{nd}$ order can also potentially be provided. These variants permit a power-scalable generation of ultra-short laser pulses with high energies, without the means for phase coupling being damaged by the high energies. Powers of well over 10 W can thus be achieved in the resonator, while the safe power range in the most common techniques using semiconductor-based, saturable absorbers is only between 0.01 and about 1 W.

For the achievement of a construction which is compact and simplified for industrial applications, it is preferably provided that at least one laser-active element is simultaneously a non-linear element of the means for phase coupling, preferably of the Kerr lens phase coupling device. With this construction, which is designed for the standard X-shaped resonator shape, a significant simplification of the structure is possible, along with its reduction in size.

Given very thin active laser media, specifically, in order to compensate the potentially lacking self-focusing and to achieve sufficient non-linearity for the phase coupling, according to another feature of the invention, an additional focusing zone of the laser light is established inside the laser resonator, and a self-focusing, transparent optical material is arranged in this focusing zone.

According to a preferred embodiment, a system of dielectric dispersion compensation mirrors, preferably Gires-Turnois interferometer mirrors, is provided as a prismless arrangement for dispersion compensation. Based on the typical bandwidth of 20 to 30 nm, these mirrors can process pulses to down to 40 fs; they demonstrate particularly low losses under 0.1% per reflection and high dispersion from 100 to 150 $fs^2$ per reflection. The power processing properties of the Gires-Turnois mirror are also excellent, and so they are most suitable specifically for the maintenance, or respectively, guaranteeing of the power scaleability even given large values.

According to an advantageous development of the invention, it is provided that a regenerative amplifier is connected downstream to the output coupler of the laser resonator. This type of amplification is suitable specifically for laser-active media with a low amplification factor, and the single pulses of the oscillator, which do not comprise more than 1 to 2 µJ, even given average output powers of up to 100 W, can thus be amplified in a relatively simple manner to into the mJ range, given repetition rates of about 10 kHz.

It is advantageously provided that the regenerative amplifier comprises a laser-active solid, preferably a thin disk of a laser-active crystal with a high amplification bandwidth, particularly of a "quasi-three-level" system such as Yb:YAG. This guarantees advantages such as identical technology, long lifetime and power scale ability not only for the primary laser oscillator but also for the amplifier.

In order to avoid a damaging or compromising of the amplifier given high amplifications, the regenerative amplifier inventively comprises means at the input side for the dispersive elongation of the laser pulse and means at the output side for the recompression of the laser pulse. This enables a safe raising of the energy of the single pulse to up to 10 mJ, which corresponds to an optical peak power in the range of 10 GW/cm$^2$.

But a raising of the single pulse energies can also be achieved in that the laser resonator contains a cavity dumping circuit or a Q-circuit. Repetition rates in the range of 1 MHz and pulse energies of about 10 µJ can be achieved by cavity dumping, for example.

Said circuits can be realized in a simple and proven manner as Bragg or Pockels cells or by an acousto-optical modulator.

BRIEF DESCRIPTION OF THE DRAWINGS

The invention, and additional features and advantages thereof, are detailed below with the aid of preferred exemplifying embodiments with reference to the enclosed drawings.

DETAILED DESCRIPTION OF THE PREFERRED EMBODIMENTS

Figure 1:
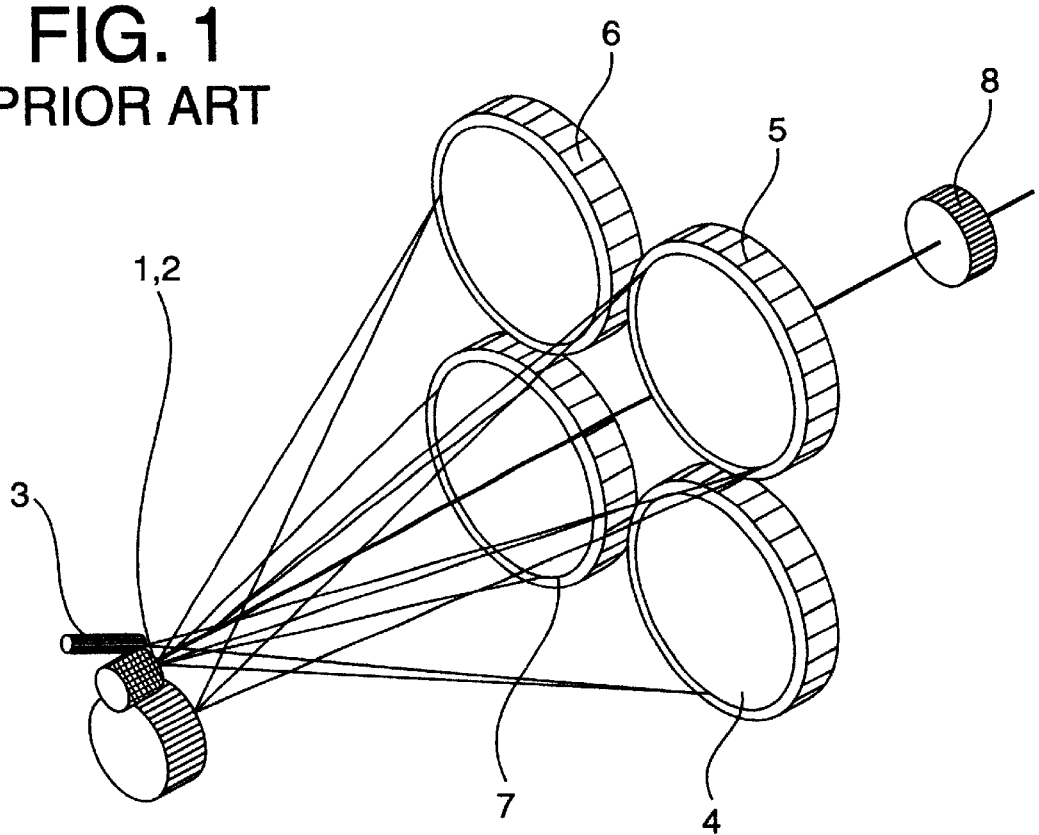
FIG. 1 depicts a known construction for a disk laser pump schema.

The laser-active medium of a disk laser, which is shown exemplarily in FIG. 1, is a thin disk 1, of a laser-active crystal, which is attached to a heat sink 2. Yttrium-aluminum-garnet (YAG) is preferably used as the laser-active crystal, this being preferably 8 to 13% Ytterbium-doped and representing a "quasi-three-level" system. Due to its relatively large fluorescence bandwidth, this material offers optimal conditions for the generation of ultra-short laser pulses in the femtosecond range. In a utilization as an active end mirror, as in FIG. 1, this disk 1 is provided with an antireflection coating on the front side and a highly reflective coating on the back. The heat sink preferably consists of copper with an indium film as heat contact, with which the disk 1 is mounted thereon, said disk having a diameter of about 7 mm and a thickness of between about 200 and 400 µm. The pump laser light is generated via fiber-coupled high-power diode lasers, whereby the end of the fiber bundle 3 is arranged near the disk 1, and the pump laser light images onto a first spherical mirror 4. The problem that the absorption length is significantly larger than the disk thickness is eliminated by four doubled passes of the pump laser light through the disk 1, realized by mirrors 4 to 7. Finally, the resonator end mirror, which also represents the output coupler for the exit of the laser light from the resonator, is referenced 8.

The advantages of the disk laser are known with respect to its power scaleability by means of an alteration of the diameter of the pump light beam or by means of the utilization of a plurality of disks in series, as are the advantages with respect to the optical degree of effectiveness of about 50 to 65% and the beam quality.

Figure 2:
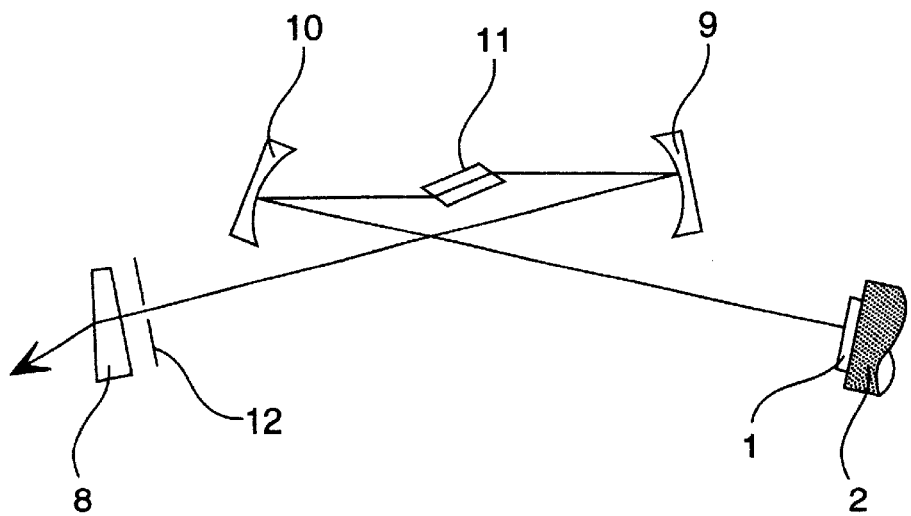
FIG. 2 schematically depicts a simple construction of an inventive resonator.

A first inventive embodiment, which is schematically depicted in FIG. 2 and in which the laser-active crystal 1 in the shape of a disk is mounted as an active end mirror on a heat sink, is used for the generation of ultra-short pulses of the laser light. The laser resonator has a conventional X-shape for the beam path, and the pump laser light is fed via one of the two concave mirrors 9 or 10, as described above. Since the thickness of this laser medium does not offer sufficient self-focusing, another focal spot is advantageously arranged within the laser resonator, typically between the two mirrors 9 and 10, a transparent optical material of a suitable non-linearity 11 being arranged in this focal spot purely for purposes of self-focusing. The power scaleability is thus obtained, and sufficient non-linearity for phase coupling of the laser modes can always be achieved by appropriate focusing. Since there is no absorption, there is no need to fear thermal problems given high energies inside the resonator, and because of the lack of any sort of power-limiting components, this arrangement is suitable for the generation of pulses with essentially arbitrarily high powers. A diaphragm 12 is preferably attached upstream to the output coupler 8. The diaphragm 12 can be realized in the form of a real diaphragm or by what is known as a "soft diaphragm", which is defined by the pumping zone in the medium. With the inventive construction, the power limits of approximately 10 W in the laser resonator (corresponding to 700 mW output power) for semiconductor-based saturable absorbers (SESAMs) can be far exceeded without danger. At least one means for dispersion control is not depicted.

Figure 3:
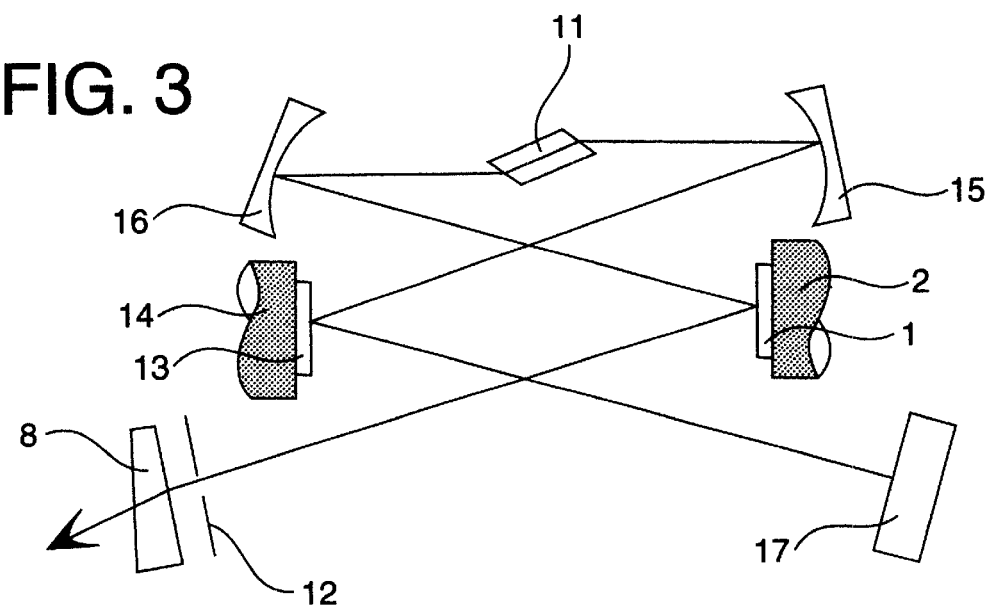
FIG. 3 is a schematic depiction of a modularly expanded inventive resonator.

FIG. 3 depicts another exemplifying embodiment of an inventive laser system in which two laser-active disks 1, 13 are provided and are used simultaneously as a folding mirror in the doubled X-shaped laser resonator. Of course, the second laser-active disk 13 is mounted on a heat sink 14. To achieve sufficient non-linearity for the Kerr lens phase coupling of the laser modes, the transparent, non-linear platelet 11 is again arranged between two concave mirrors 15 and 16. As can be seen clearly, this modular construction of the laser system represents a preferred possibility of power scaling in that additional laser-active media can be inserted, according to the desired output power.

Besides the described Kerr lens phase coupling, it is also possible to use other non-linear optical phase couplers, particularly APM devices, i.e. devices for "additive pulse mode-locking", as well as different non-linear mirror arrangements which are based on second-order non-linearity. It is common to all these methods that they are passive, non-linear optical methods of phase modulation and they thus permit a power-scaling by means of beam diameter adjustment.

As a preferred solution for dispersion control, the two mirrors 15 and 16 are designed as Gires-Turnois interferometer mirrors, it being possible to thereby realize an advantageous prismless dispersion control. The end mirror 17 of the laser resonator is also advantageously designed as a Gires-Tumois mirror. Their internal optical field approaches that of highly reflective standard reflectors; they comprise low losses of less than 0.1% per reflection; and, due to their typical bandwidth of 20 to 30 nm, such Gires-Turnois mirrors can be inserted to down to pulses of 40 fs. Gires-Tumois mirrors consist of an upper reflector, a spacer region and a practically 100% lower reflector. The dispersion of the group transit time of the arrangement of Gires-Turnois mirrors is more intensely negative over a specific bandwidth than in other mirror structures, such as in dispersive mirrors ("chirped mirrors"), so that fewer reflections are required for the dispersion correction. Since a lower penetration depth given the utilization of Gires-Turnois mirrors also means less lost material of the mirror, there is the additional advantage that the losses inside the laser resonator are significantly reduced.

Figure 4:
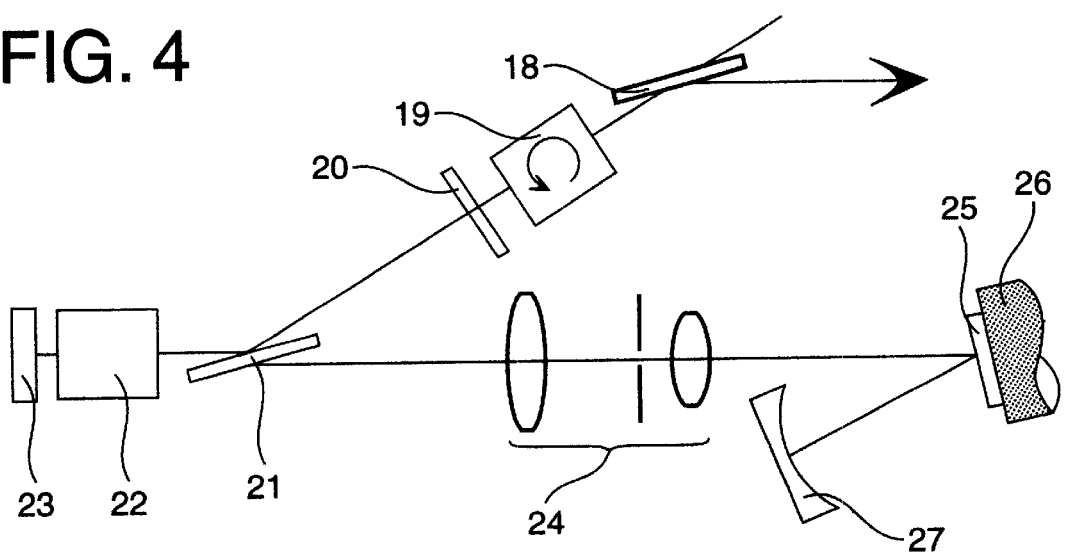
FIG. 4 depicts an inventive regenerative amplifier schematically.

Since the pulse energies emanating directly from the laser oscillator are not sufficient for many applications in science and technology, an amplification of the laser pulse, which, due to high repetition rate, originally lies only under 1 $\mu$J, is advantageously provided. To this end, according to a preferred embodiment of the invention, a regenerative amplifier as depicted schematically in FIG. 4 is connected downstream to the laser resonator described above.

A linearly polarized seed pulse enters into the amplifier through the polarizer 18 (beam expansion optic and pulse selector not depicted), which can be a thin film or a high-power die. The pulse then traverses a 45° Faraday rotator 19 and a half-wave plate 20, which jointly rotate the polarization plane 90° relative to the entry and which reciprocally cancel out each other's effect. The seed pulse then reaches an electro-optical cell 22 with static quarter-wave dislocation or a separate quarter-wave plate, such as a Bragg or Pockels cell, via another polarizer 21, passing through said cell again subsequent to the first pass, on the basis of reflection at the highly reflective mirror 23. The confocal lens pair 24, which can potentially be replaced by a confocal mirror pair, brings the beam to a fitting size for the laser-active element, which is again advantageously constructed as disk 25 on a heat sink 26, and simultaneously acts as a spatial filtering element for filtering out small wave-front disturbances. The laser-active element 25 is again provided as a folding mirror in front of the end mirror 27. This amplifier arrangement is traveled until a saturation occurs in the amplification. Pulse energies in the range of 1 mJ are achieved with this construction. If still higher pulse energies are to be achieved, it is necessary to apply the CPA concept (Chirped Pulse Amplification), and to provide means for dispersive elongation of the laser pulse at the input side and means for recompressing the laser pulse at the output side. Of course, it is also possible to provide a plurality of amplifier elements for the achievement of higher powers.

In all the cited exemplifying embodiments, the diaphragm which is required in the laser resonator, particularly for the Kerr lens phase coupling arrangement, can be realized in the form of a real diaphragm, or by the pumping zone in the laser-active medium itself, i.e. what is known as a "soft filter".

The inventive laser system with ultra-short pulses can be employed for many applications. Direct plasma formation and direct material deposition without melting of the material are very desirable in many areas of material processing. A low repetition rate per surface element is necessary, depending on the focus diameter. Given a focus diameter of approximately 50 to 100 $\mu$m, the repetition rate should not exceed 10 kHz. This can be achieved by conventional Q-circuits, or respectively, by regenerative amplification (in the range of approximately 50 to 100 passes), with simultaneous amplification of the single pulse. Higher laser repetition rates in the MHz range, such as are generated by means of cavity dumping of the oscillator, can be utilized by smaller focuses, potentially together with a spatial scanning, whereby the repetition rate per surface element is sharply reduced again.

For example, the smallest micro-pores can be bored in plastic films. Medical utilization can also be offered, for example, particularly in the dental field, and specifically the application of systems with decelerated pulse sequence (from approximately 100 MHz to approximately 10 kHz) and thus increased single-pulse energy, of up to 0.5 mJ given a pulse period of approximately 200 fs. Rapid prototyping would be another example of an application, in which the UV or laser light used for the hardening of the polymer that forms the prototype currently only reaches its surface and thus entails long processing times. In contrast, a focused high-power laser with pulses in the femtosecond range penetrates even under the surface and leads to a considerably shortened time of the rapid prototyping.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A laser system for the generation of ultra-short light pulses, with a laser resonator which comprises at least one active solid-state oscillator element in the form of a thin disk of a laser-active crystal with a high amplification bandwidth in combination with at least one means for the phase coupling of the laser modes in the form of a passive, non-linear element and at least one means for dispersion compensation in the form of a prismless arrangement.

2. A laser system according to claim 1, wherein the means for phase coupling is constructed as an APM device.

3. A laser system according to claim 1, wherein said laser-active crystal comprises a quasi-three-level system.

4. A laser system according to claim 3, wherein said quasi-three-level system is Yb:YAG.

5. A laser system according to claim 1, wherein the means for phase coupling is preferably constructed as a Kerr lens phase coupling device.

6. A laser system according to claim 5, wherein said Kerr lens phase comply device has a soft diaphragm.

7. A laser system according to claim 5, wherein at least one laser-active element is simultaneously a non-linear element of the Kerr lens phase coupling device.

8. A laser system according to claim 1, wherein the means for phase coupling is constructed as a non-linear mirror arrangement with second order non-linearity.

9. A laser system according to claim 1, wherein at least one laser-active element is simultaneously a non-linear element of the means for phase coupling.

10. A laser system according to claim 9, wherein an additional focal zone of the laser light is set up inside the laser resonator, and a self-focusing, transparent optical material is arranged in this focal zone.

11. A laser system according to claim 1, wherein a system of dielectric dispersion compensation mirrors is provided as the prismless arrangement.

12. A laser system according to claim 11, wherein the system of dielectric dispersion compensation mirrors comprising Gires-Turnois interferometer mirrors.

13. A laser system according to claim 1, wherein the laser resonator contains one of a cavity dumping circuit and a Q circuit.

14. A laser system according to claim 13, wherein the circuit comprises one of a Bragg cell, a Pockel cell and an acoust-optical modulator.

15. A laser system according to claim 1, wherein a regenerative amplifier is connected downstream to an output coupler of the laser resonator.

16. A laser system according to claim 15, wherein the regenerative amplifier comprises means for dispersive elongation of the laser pulses at an input side and means for recompression of the laser pulses at an output side.

17. A laser system according to claim 15, wherein the regenerative amplifier comprises a laser-active solid.

18. A laser system according to claim 17, wherein said laser-active solid comprises an active end mirror.

19. A laser system according to claim 17, wherein said thin disk of a laser active crystal comprises a quasi-three-level system.

20. A laser system according to claim 19, wherein said quasi-three-level system is Yb:YAG.

21. A laser system for the generation of ultra-short light pulses, with a laser resonator which comprises at least one active solid-state oscillator element in the form of a thin disk of a laser-active crystal with a high amplification bandwidth arranged as an active end mirror and mounted on a heat sink in combination with at least one means for the phase coupling of the laser modes in the form of a passive, non-linear element and at least one means for dispersion compensation in the form of a prismless arrangement.

22. A laser system according to claim 21, wherein said disk has a diameter of about 7 millimeters.

23. A laser system according to claim 21 wherein said heat sink is formed of copper with an indium film as a heat contact.

24. A laser system according to claim 23, wherein said disk has a thickness in the range of about 200 to 400 micrometers.

25. A laser system according to claim 24, including at least one fiber bundle-coupled high power diode laser for generating pump laser light, with an end of the fiber bundle arranged near the disk, a series of spherical mirrors arranged so that the pump laser light is directed onto the series of spherical mirrors and reflected onto the disk between each of the series of mirrors to provide a multiple of doubled passes through the disk.

26. A laser system according to claim 25 wherein four spherical mirrors are provided as the series of spherical mirrors.

* * * * *